Oct. 10, 1939.　　　P. LANDRUM　　　2,175,473

POWER TRANSMISSION

Filed May 2, 1938

INVENTOR
Porter Landrum
BY
Charles H. Bassett
ATTORNEY

Patented Oct. 10, 1939

2,175,473

UNITED STATES PATENT OFFICE 2,175,473

POWER TRANSMISSION

Porter Landrum, Birmingham, Ala.

Application May 2, 1938, Serial No. 205,557

6 Claims. (Cl. 64—27)

My invention relates to power transmissions and has for an object the provision of a transmission adapted for use with internal combustion engines whereby the power load may be more uniformly transmitted throughout the working cycle of the engine than is possible with the usual rigid direct drive transmission now commonly used on automobiles, motorcycles, and the like.

My invention further contemplates the provision of a transmission which permits the pistons of an internal combustion engine to accelerate at the commencement of the firing stroke to prevent fuel knocks.

My invention further contemplates the provision of a transmission embodying yieldable means in the form of a helical twist spring having its ends connected to the driving and driven parts to absorb shocks and irregularities in the power load.

My invention further contemplates the provision of a transmission embodying a helical twist spring which is so arranged, designed, and enclosed as to overcome relatively heavy loads without breaking or becoming distorted. When flexible means are interposed between an internal combustion engine and a flywheel, said means is subjected to the heaviest load or shock when the flywheel attempts to overrun the crankshaft. It is therefore necessary to provide a flexible connection which will carry a heavy load regardless of the direction in which the power is being transmitted. In order to prevent violent shocks to the twist spring, the coils of same are arranged to frictionally engage with each other when the spring is being wound and is confined in a housing to prevent unwinding beyond a certain limit.

My invention embodies other novel features, details of construction, and arrangement of parts which are hereinafter set forth in the specification and claims and illustrated in the accompanying drawing, forming part thereof, wherein:

Figure 1:
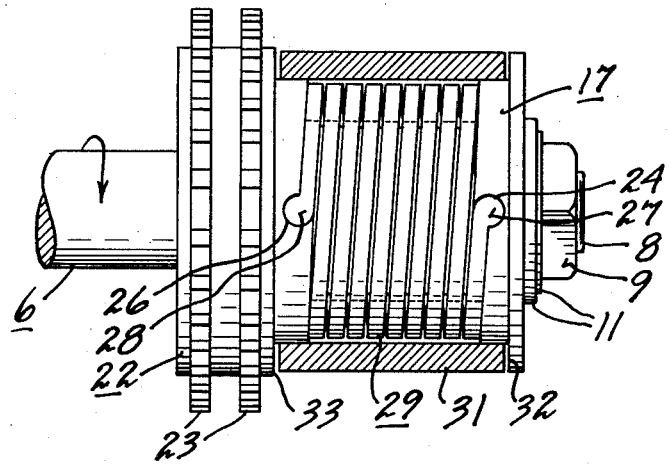
Fig. 1 is a side elevational view showing my improved power transmission, the spring confining sleeve being shown in section.
Figure 2:
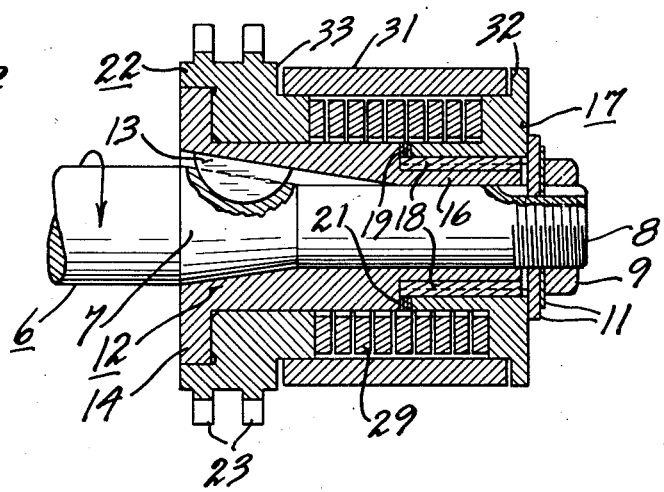
Fig. 2 is a longitudinal sectional view of the power transmission.
Figure 3:
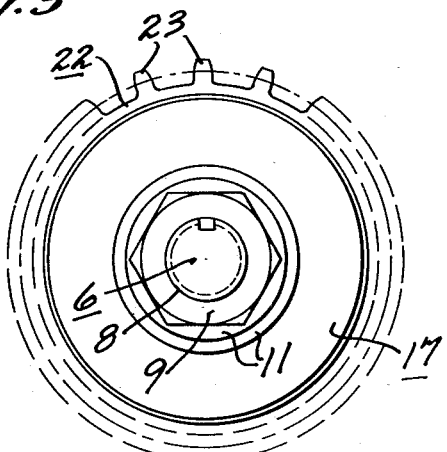
Fig. 3 is an end elevational view of the transmission.

Referring now to the drawing for a better understanding of my invention, I show a power transmission comprising a drive shaft 6 which is tapered at 7 and has a threaded end 8 to receive a nut 9 and washers 11. A bushing 12 is mounted on the drive shaft and secured against relative rotational movement by means of a key 13. The bushing is formed with a flange 14 and is reduced in diameter at 16 to receive a driving member 17.

The bushing 12 and the driving member 17 are secured against relative rotational movement by means of keys 18 and the driving member is adjustable laterally on the bushing by means of the shims 19 interposed between the bushing shoulder 21 and the inner end of the driving member. A driven member 22 is journaled on the bushing adjacent the flange 14 and formed with sprocket teeth 23 adapted to drive a sprocket chain (not shown).

Arcuate recesses 24 and 26 are formed in the driving member 17 and driven member 22, respectively, to receive the rounded ends 27 and 28, respectively, of the twisted helical spring 29 which is preferably formed of metal having a rectangular cross section. A sleeve 31 is provided to enclose the spring and is preferably journaled between the shoulders 32 and 33 formed on the driving member 17 and driven member 22, respectively, but may be constructed as forming an integral part of either the driven or driving member. It will be observed that the recesses 24 and 26 permit radial movement of the spring ends.

The power transmission illustrated in the drawing was particularly designed for use on motorcycles and has proven very practicable in operation as it permits an operator to drive at speeds between ten and fifteen miles per hour without causing the motor cycle to buck when running in high gear. It has heretofore been necessary to shift into lower gears when operating at speeds less than from twenty to twenty-five miles per hour. This type of transmission also absorbs and prevents the usual shocks and vibrations which are now delivered from the engine to the frame and operator on motorcycles having a rigid drive transmission.

Figure 4:
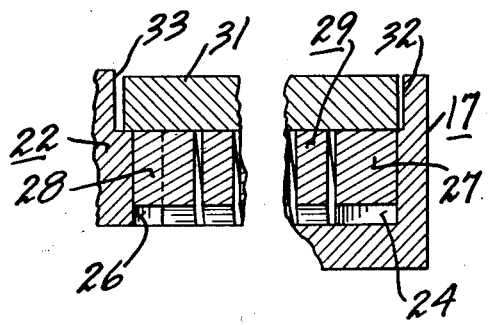
Fig. 4 is a fragmentary, detail, sectional view showing the manner in which the spring moves outwardly into contact with the confining sleeve when power is being transmitted from the driving member to the driven member.

In operation, the drive shaft preferably rotates in the direction indicated by the arrow and acts through the driving member 17 to unwind the twist spring 29 and drive the driven member 22. If the load being transmitted is strong enough to overcome the normal spring action of the spring, the spring will be unwound until the outside diameter is the same as the inside diameter of the sleeve 31 after which, the spring acts with the sleeve to provide a direct or positive drive. As the spring coils are quite closely confined by the driving member, driven member, and sleeve, they cannot buckle or become broken. Fig. 4 illustrates the spring coils in their unwound position and in engagement with the confining sleeve.

When travelling down hills or stopping it is the usual practice to leave the clutch engaged and thereby employ the engine as a braking force to retard the speed of the motorcycle in which event, the braking force is transmitted from the driven member 22 to the spring 29, then to the driving member and drive shaft to the engine. This force causes the spring to be wound until the coils have either overcome the force in their normal manner or have moved into engagement with each other and become frictionally engaged and finally wedged into a compact mass to prevent further relative movement of the driven and driving members in that direction.

It will thus be seen that when power is transmitted in either direction that the spring is placed either under tension or compression and so confined as to prevent breakage. In order to adjust the amount of relative movement of the driving and driven members, the total shim thickness between the shoulder 21 and the end of the driving member may be changed to suit the operator.

While I have shown my invention in but one form it is obvious to those skilled in the art that it is not so limited but is susceptible of various changes and modifications without departing from the spirit thereof; and I desire, therefore, that only such limitations shall be placed thereupon as are imposed by the prior art.

I claim:

1. In a power transmission, a helical twist spring, end members secured at each end of said spring, said end members being journaled for relative rotational movement and secured against relative lateral movement and serving to bring the coils of said spring into frictional engagement to form a compact mass when the force being transmitted is great enough to overcome the resistance offered by the spring, and a cylindrical member covering said spring, said cylindrical member being journaled on said end members and acting to uniformly engage and to confine an increase in the diameter of the spring to a predetermined limit and thereby place the spring coils under compression.

2. In a power transmission having a driving member and a driven member journaled for relative rotational movement, a helical twist spring having its ends connected to the driving member and the driven member for uniform expansion and contraction throughout its entire length, said spring being twisted in a direction acting to increase the diameter of the spring coils when power is being transmitted therethrough, and a floating cylindrical member journaled with respect to the driving member, and the driven member and acting to uniformly engage and to confine an increase in the diameter of the spring coils to a predetermined limit and thereby place the spring coils under compression.

3. In a power transmission, a drive shaft, a driving member secured on said drive shaft, a driven member journaled on said drive shaft, a helical twist spring having its ends connected to the driving member and the driven member for uniform expansion and contraction of said spring throughout its entire length, and a floating sleeve journaled with respect to the driving member and the driven member covering said spring to confine an increase in the diameter of the spring coils to a predetermined limit of uniform expansion.

4. In a power transmission, a drive shaft, a driving member secured on said drive shaft, a driven member journaled on said drive shaft, a helical twist spring having its ends connected to the driving member and the driven member for uniform expansion and contraction of said spring throughout its entire length, a floating sleeve journaled with respect to the driving member and the driven member covering said spring to confine an increase in the diameter of the spring coils to a predetermined limit, and adjustable means for determining the distance between the driving member and the driven member for changing the limit of relative rotational movement between the driving member and the driven member.

5. A power transmission according to claim 4 in which, the sleeve is journaled on the driving member and the driven member.

6. In a power transmission, a drive shaft, a bushing secured on said drive shaft, a driving member secured on one end of said bushing, a driven member journaled on the other end of said bushing, a helical twist spring mounted on said bushing between the driving member and the driven member, means defining radially disposed recesses in the driving member and the driven member to receive the ends of the spring for radial movement therein, means for adjusting the position of the driving member axially along said bushing for determining the distance between the driving member and the driven member for changing the limit of rotational movement between the driving member and the driven member, and a floating sleeve journaled on the driving member and the driven member for uniform engagement with the spring throughout its entire length to confine an increase in the diameter of the spring to a predetermined limit.

PORTER LANDRUM.